(12) United States Patent
Salter et al.

(10) Patent No.: US 11,378,440 B2
(45) Date of Patent: Jul. 5, 2022

(54) PAYLOAD BALANCE INDICATOR

(71) Applicant: Ford Global Technologies, LLC, Dearborn, MI (US)

(72) Inventors: Stuart C. Salter, White Lake, MI (US); David Brian Glickman, Southfield, MI (US); Phillip Marine, Royal Oak, MI (US); Hussein Berry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 505 days.

(21) Appl. No.: 16/539,498

(22) Filed: Aug. 13, 2019

(65) Prior Publication Data

US 2021/0048334 A1    Feb. 18, 2021

(51) Int. Cl.
  *G01G 19/12* (2006.01)
  *B60W 40/13* (2012.01)
  *G01G 23/36* (2006.01)

(52) U.S. Cl.
  CPC .............. *G01G 19/12* (2013.01); *B60W 40/13* (2013.01); *G01G 23/36* (2013.01); *B60G 2400/61* (2013.01); *B60W 2040/1307* (2013.01)

(58) Field of Classification Search
  CPC ....... G01G 19/12; G01G 23/36; B60W 40/13; B60W 2400/61; B60W 2040/1307; B60G 2400/61
  See application file for complete search history.

(56) References Cited

U.S. PATENT DOCUMENTS

| 3,646,512 A | 2/1972 | Borgstede |
| 4,108,262 A | 8/1978 | Anderson |
| 4,635,739 A * | 1/1987 | Foley .................... G01G 19/10 177/208 |

(Continued)

FOREIGN PATENT DOCUMENTS

CN        203819111 U      9/2014

OTHER PUBLICATIONS

Kopier, Michelle, OEM Off-Highway, Ready, Set, Load!, "A behind the scenes look at Volvo's on-board weighing system set to launch at INTERMAT 2012 in Paris, France," Mar. 16, 2012 (6 pages).

*Primary Examiner* — Randy W Gibson
(74) *Attorney, Agent, or Firm* — Vichit Chea; Price Heneveld LLP (57) ABSTRACT

A load balance system including first and second load indicators visible outside of a vehicle having a bed, first and second load sensors configured to sense respective first and second load weights in respective first and second bed areas. The load balance system includes a controller in communication with the first and second load sensors and the first and second load indicators. The controller is configured to activate the first and second load indicators to generate the same first and second outputs in response to detection of respective first and second load weights that are less than a predetermined threshold value. The controller is configured to activate the first and second load indicators to generate different first and second outputs in response to the detection of respective first and second load weights when one of the first and the second load weights is above the predetermined threshold value.

14 Claims, 9 Drawing Sheets

(56) References Cited

U.S. PATENT DOCUMENTS

| | | | | |
|---|---|---|---|---|
| 4,835,719 A | * | 5/1989 | Sorrells | G01G 19/10 701/1 |
| 4,852,674 A | * | 8/1989 | Gudat | G01G 19/10 177/DIG. 10 |
| 4,921,578 A | | 5/1990 | Shiraishi et al. | |
| 4,981,186 A | | 1/1991 | Shankle et al. | |
| 5,167,289 A | * | 12/1992 | Stevenson | G01G 5/04 177/209 |
| 6,157,889 A | | 12/2000 | Baker | |
| 7,256,358 B2 | * | 8/2007 | Kesselman | G01G 23/3721 340/666 |
| 8,981,918 B2 | | 3/2015 | Panse | |
| 9,631,969 B1 | * | 4/2017 | Whalen | G01G 19/02 |
| 9,933,294 B1 | | 4/2018 | Salter et al. | |
| 10,048,113 B2 | | 8/2018 | Salter et al. | |
| 2001/0009206 A1 | | 7/2001 | Lines | |
| 2003/0090384 A1 | | 5/2003 | Nishimura et al. | |
| 2006/0125919 A1 | | 6/2006 | Camilleri et al. | |
| 2009/0146846 A1 | | 6/2009 | Grossman | |
| 2010/0131182 A1 | | 5/2010 | Deegan et al. | |
| 2014/0054096 A1 | | 2/2014 | Carruthers et al. | |
| 2016/0052447 A1 | | 2/2016 | Salter et al. | |
| 2016/0121791 A1 | | 5/2016 | Shimizu | |
| 2016/0177521 A1 | | 6/2016 | Laugwitz et al. | |
| 2017/0113607 A1 | | 4/2017 | Corrales Salgado et al. | |

* cited by examiner

PAYLOAD BALANCE INDICATOR

FIELD OF THE DISCLOSURE

The present disclosure generally relates to vehicle load indicating systems.

BACKGROUND OF THE DISCLOSURE

Vehicles are often configured to carry a load and to have load capacities. Vehicles may be configured to monitor a load distribution within a vehicle. It may be desirable to for an operator to know the load being added to the vehicle and the distribution of the load in the vehicle.

SUMMARY OF THE DISCLOSURE

According to one aspect of the present disclosure, a load balance system for a vehicle includes first and second load indicators visible outside of the vehicle, a bed disposed in the vehicle, a first load sensor configured to sense a first load weight in a first areas of the bed, a second load sensor configured to sense a second load weight in a second area of the bed, and a controller. The controller is in communication with the first load sensor, the second load sensor, a first load indicator, and a second load indicator. The controller is configured to activate the first and second load indicators to generate first and second outputs in response to a detection of a first load weight and a second load weight that are less than a predetermined threshold value, wherein the first and second outputs are the same. The controller is also configured to activate the first and second load indicators to generate first and second outputs in response to the detection of the first load weight and the second load weight when one of the first load weight and the second load weight is above the predetermined threshold value, wherein the first and second outputs are different.

Embodiments of the first aspect of the disclosure can include any one or a combination of the following features:
- the first load indicator includes a first bed light and the second load indicator includes a second bed light;
- the first bed light is configured to illuminate the first bed area to indicate an availability of the first bed area for receiving an additional load weight;
- the second bed light is configured to illuminate the second bed area to indicate an availability of the second bed area for receiving the additional load weight;
- the first load indicator and the second load indicator each include RGB LEDs (Red Green Blue Light Emitting Diodes);
- the first load indicator and the second load indicator are each configured to display a first color when the first load weight and the second load weight are both below the predetermined threshold value;
- one of the first load indicator or the second load indicator is configured to display a first color when one of the first load weight or the second load weight is below the predetermined threshold value, and wherein another of the first load indicator or the second load indicator is configured to display a second color when one of the first load weight and the second load weight is above the predetermined threshold value;
- the first load indicator includes a first tail light and the second load indicator includes a second tail light;
- the first tail light and the second tail light each include one or more chambers configured to display the respective first output and the respective second output;
- the first and second tail lights are each configured to illuminate the same one or more chambers when the first load weight and the second load weight are both below a predetermined threshold value;
- the first and second tail lights are each configured to illuminate different amounts of the one or more chambers when one of the first load weight and the second load weight is above the predetermined threshold value and one of the first load weight and the second load weight is below the predetermined threshold value;
- the first and second load indicators are disposed outside of the vehicle;
- the first and second load indicators are disposed inside of the vehicle; and/or
- the predetermined threshold value comprises 110% of the lower of the first load weight and the second load weight.

According to another aspect of the present disclosure, a load balance system for a vehicle includes first, second, third, and fourth load sensors disposed in respective first, second, third, and fourth areas of a bed disposed in the vehicle; first, second, third, and fourth load indicators corresponding to respective, first, second, third, and fourth areas of the bed; and a controller in communication with the first, second, third, and fourth load indicators and the first, second, third, and fourth load sensors. The controller is configured to determine a lowest weight of the first load weight, the second load weight, the third load weight, and the fourth load weight. The controller is further configured to calculate a predetermined threshold value by multiplying the lowest weight of the first load weight, the second load weight, the third load weight, and the fourth load weight by a predetermined percentage. The controller is configured to determine whether each of the first load weight, the second load weight, the third load weight, and the fourth load weight is greater than, equal to, or less than the predetermined threshold value. The controller is configured to activate at least one of the first load indicator, the second load indicator, the third load indicator, and the fourth load indicator to display a first signal indicative of the first load weight, the second load weight, the third load weight, or the fourth load weight being less than the predetermined threshold value. The controller is further configured to activate the first load indicator, the second load indicator, the third load indicator, or the fourth load indicator to display a second signal indicative of the first load weight, the second load weight, the third load weight, or the fourth load weight being greater than or equal to the predetermined threshold value if the first load weight, the second load weight, the third load weight, or the fourth load weight is greater than the predetermined threshold value.

Embodiments of the second aspect of the disclosure can include any one or a combination of the following features:
- the first load indicator includes a first bed light configured to illuminate a first quadrant of the bed, the second load indicator includes a second bed light configured to illuminate a second quadrant of the bed, the third load indicator includes a third bed light configured to illuminate a third quadrant of the bed, and the fourth load indicator includes a fourth bed light configured to illuminate a fourth quadrant of the bed.

According to another aspect of the present disclosure, a method for balancing a vehicle load includes the steps of detecting a first load weight in a first area of the vehicle bed, detecting a second load weight in a second area of the vehicle bed, identifying a lower weight of the first load weight and the second load weight, determining a predetermined threshold value by multiplying the lower weight of the first load weight and the second load weight by a predetermined percentage, activating a load indicator to generate a first signal when the first load weight and the second load weight are less than the predetermined threshold value, and activating the load indicator to generate a second signal when the first load weight and the second load weight are greater than the predetermined threshold value.

Embodiments of the third aspect of the disclosure can include any one or a combination of the following features:
- the step of activating a load indicator to generate a first signal when the difference between the first load weight and the second load weight is less than a predetermined threshold value includes generating a first audible signal;
- the step of activating a load indicator to generate a second signal when the difference between the first load weight and the second load weight is greater than or equal to a predetermined threshold value includes generating a second audible signal; and/or
- the step of detecting a third load weight in a third area of the vehicle bed; detecting a fourth load weight in a fourth area of the vehicle bed; identifying a lowest weight of the first load weight, the second load weight, the third load weight, and the fourth load weight; determining a predetermined threshold value by multiplying the lowest weight of the first load weight, the second load weight, the third load weight, and the fourth load weight by a predetermined percentage; activating the load indicator to generate a first signal when the first load weight, the second load weight, the third load weight, and the fourth load weight are all less than the predetermined threshold value; and activating the load indicator to generate a second signal when one or more of the first load weight, the second load weight; the third load weight, and the fourth load weight is greater than the predetermined threshold value.

These and other aspects; objects, and features of the present disclosure will be understood and appreciated by those skilled in the art upon studying the following specification, claims, and appended drawings.

DETAILED DESCRIPTION OF THE PREFERRED EMBODIMENTS

It is to be understood that variations and modifications can be made on the aforementioned structure without departing from the concepts of the present disclosure, and further it is to be understood that such concepts are intended to be covered by the following claims unless these claims by their language expressly state otherwise.

Referring to FIGS. 1-8, a load balance system 12 of a vehicle 10 includes first and second load indicators 50 visible outside of the vehicle 10, a bed 22 disposed in the vehicle 10, a first load sensor 30 configured to sense a first load weight (for example, load B) in a first area A of the bed 22, a second load sensor 30 configured to sense a second load weight (for example, load B) in a second area A of the bed 22, and a controller 132 in communication with the first load sensor 30, the second load sensor 30, the first load indicator 50, and the second load indicator 50. The controller 132 is configured to activate the first and second load indicators 50 to generate first and second outputs 99 in response to a detection of a first load weight (for example, load B) and a second load weight (for example, load B) that are less than a predetermined threshold value (see, for example, steps 176 and 180 of FIG. 7), wherein the first and second outputs 99 are the same. The controller 132 is further configured to activate the first and second load indicators 50 to generate first and second outputs 99 in response to the detection of the first load weight (for example, load B) and the second load weight (for example, load B) when one of the first load weight (for example, load B) and the second load weight (for example, load B) is above the predetermined threshold value (see, for example, steps 176 and 180 of FIG. 7), wherein the first and second outputs 99 are different.

Figure 3:
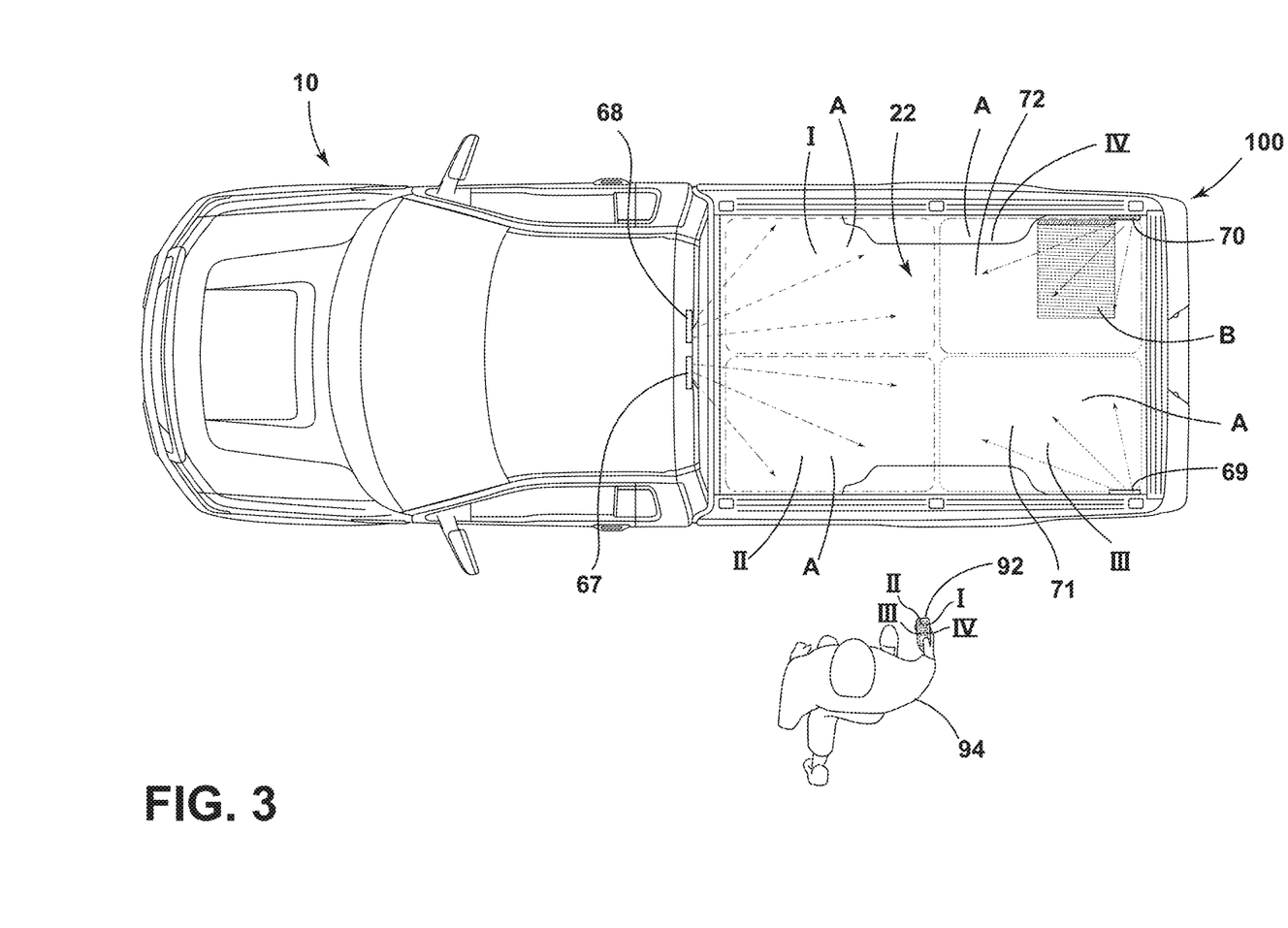
FIG. 3 is a top elevational view of a vehicle equipped with a load indicator system.
Figure 4:
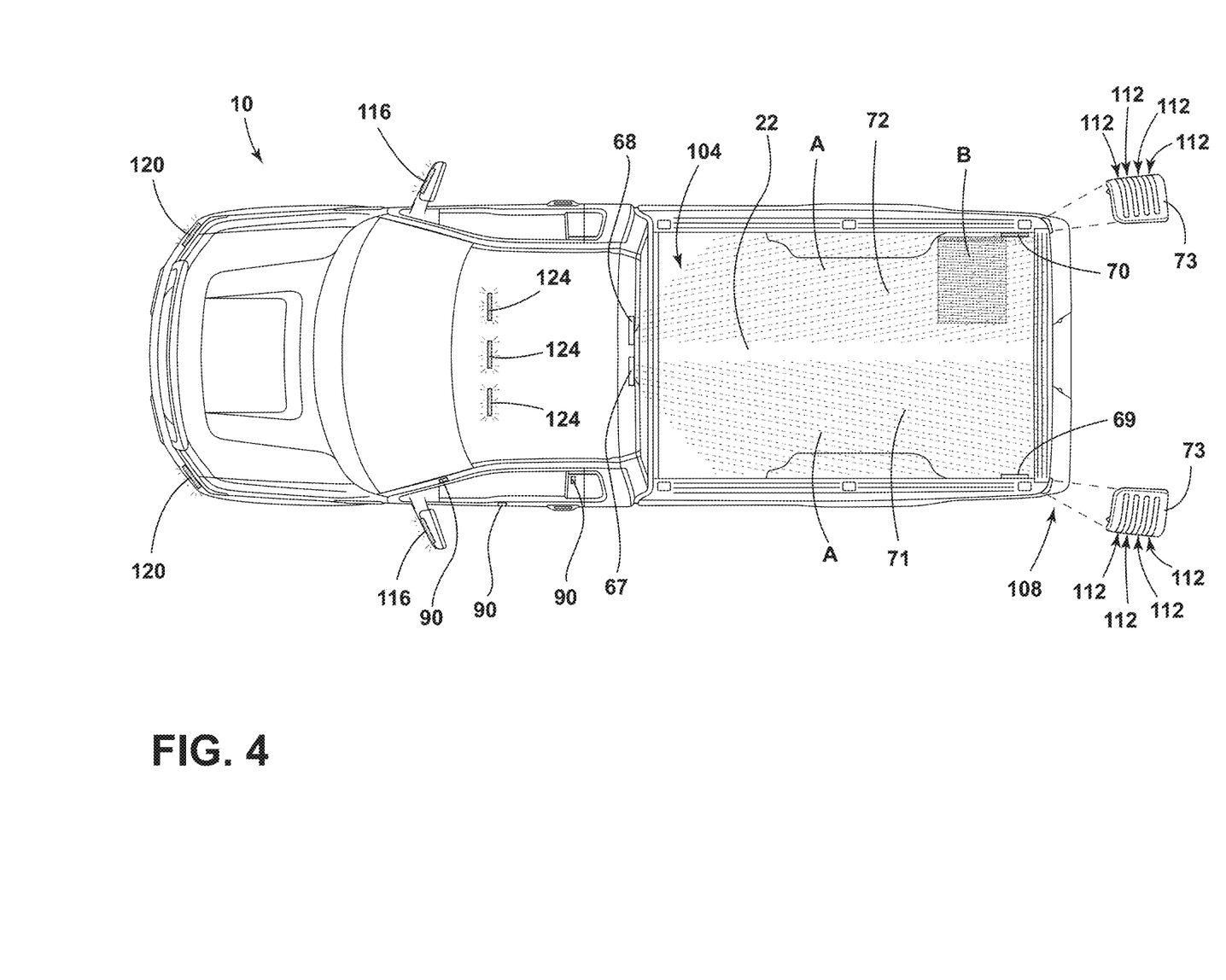
FIG. 4 is a top elevational view of a variation of the vehicle equipped with a load indicator system shown in FIG. 3.
Figure 5:
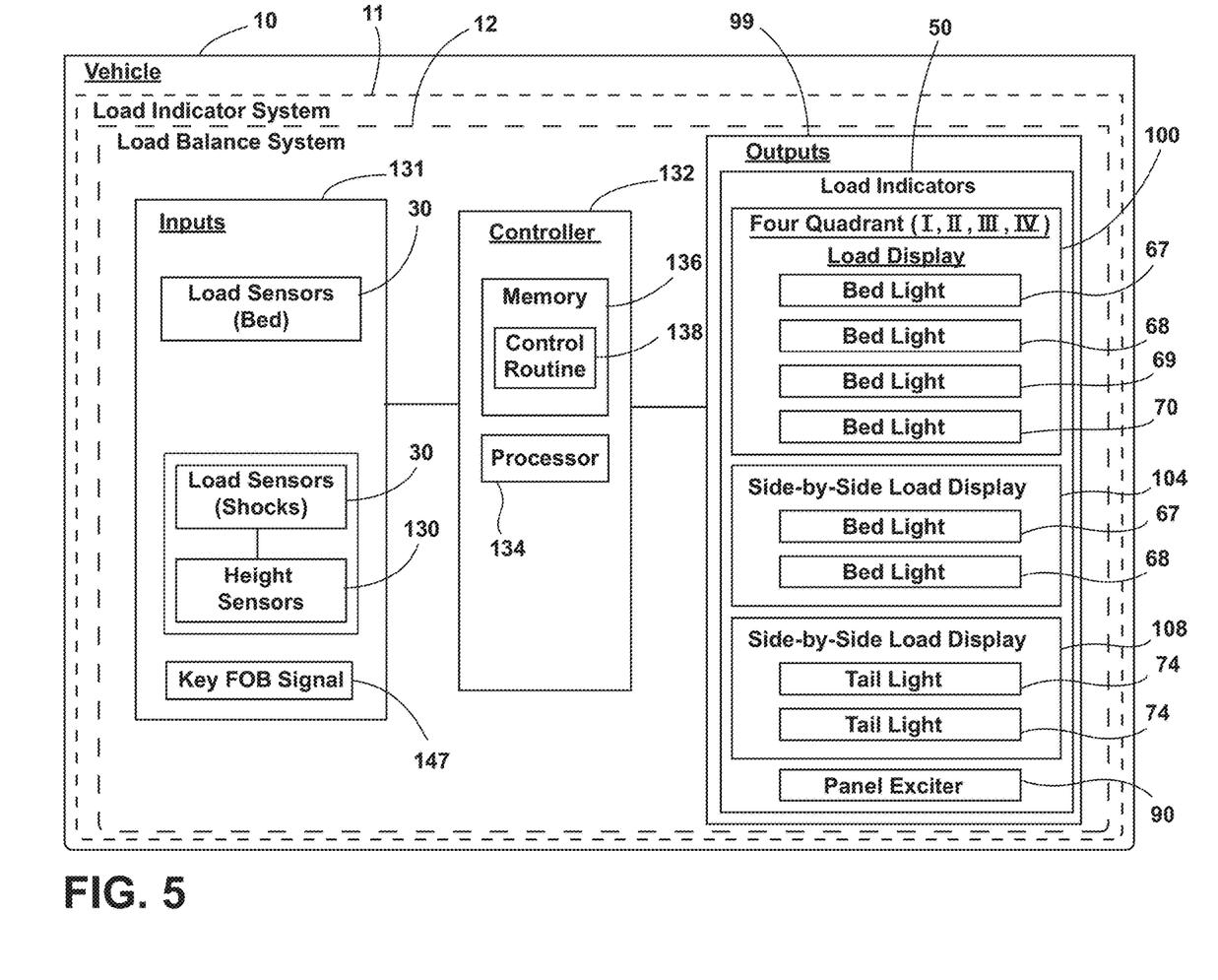
FIG. 5 is a schematic block diagram of a vehicle including a load balance routine of a load indicator system, according to one embodiment.
Figure 6:
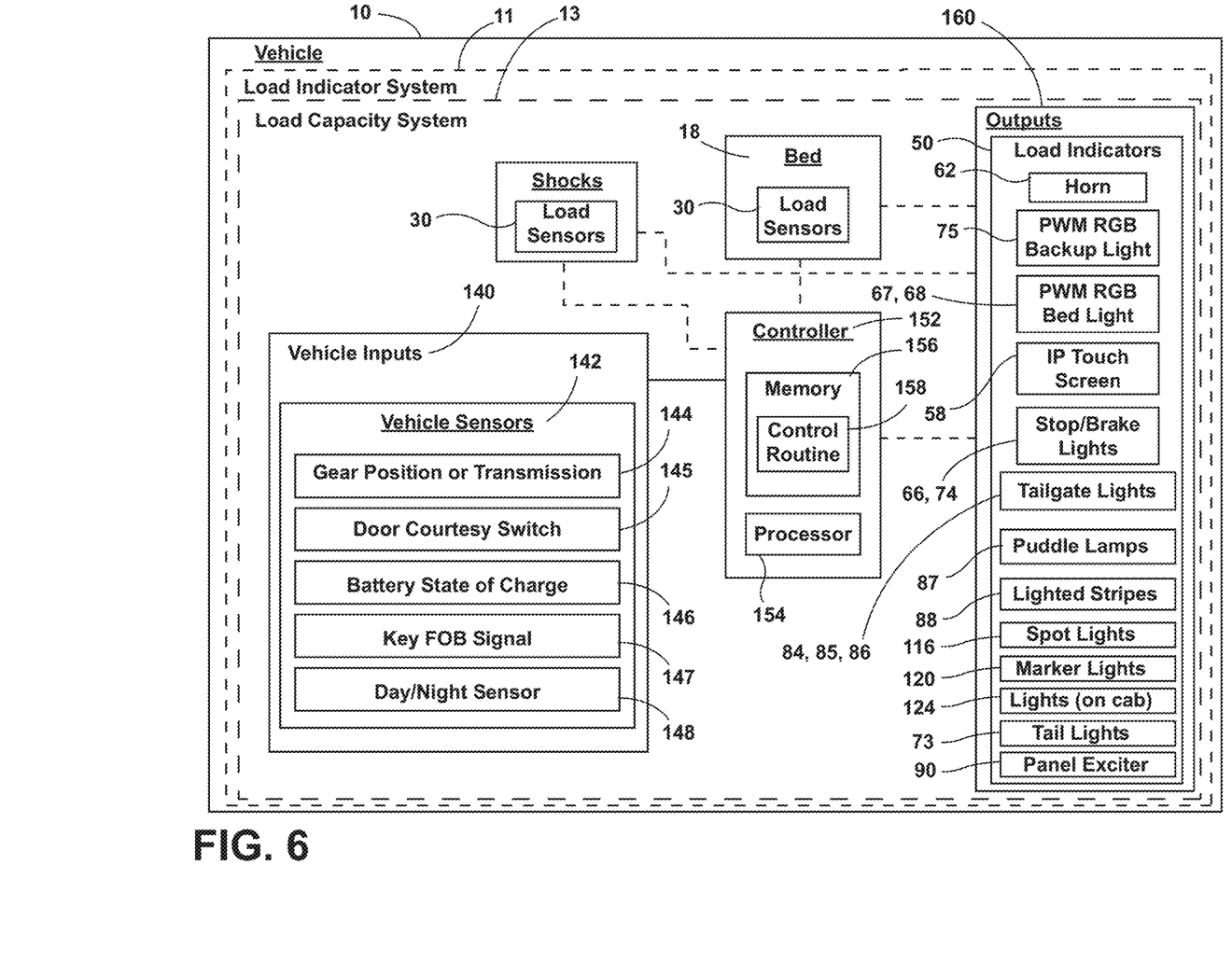
FIG. 6 is a schematic block diagram of a vehicle including a RGB scale routine of a load indicator system, according to one embodiment.
Figure 7:
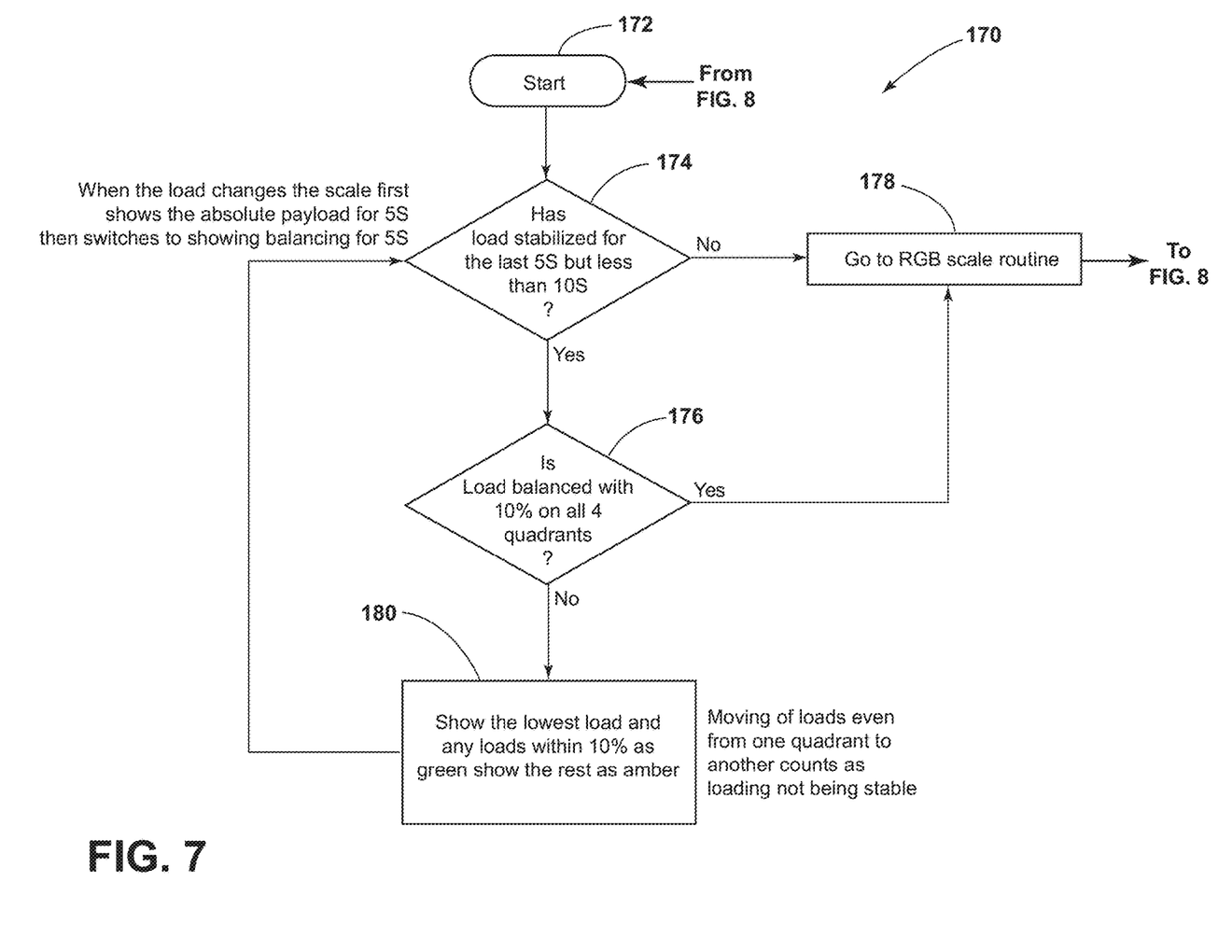
FIG. 7 is a flow chart showing a load balance routine of a load indicator system.
Figure 8:
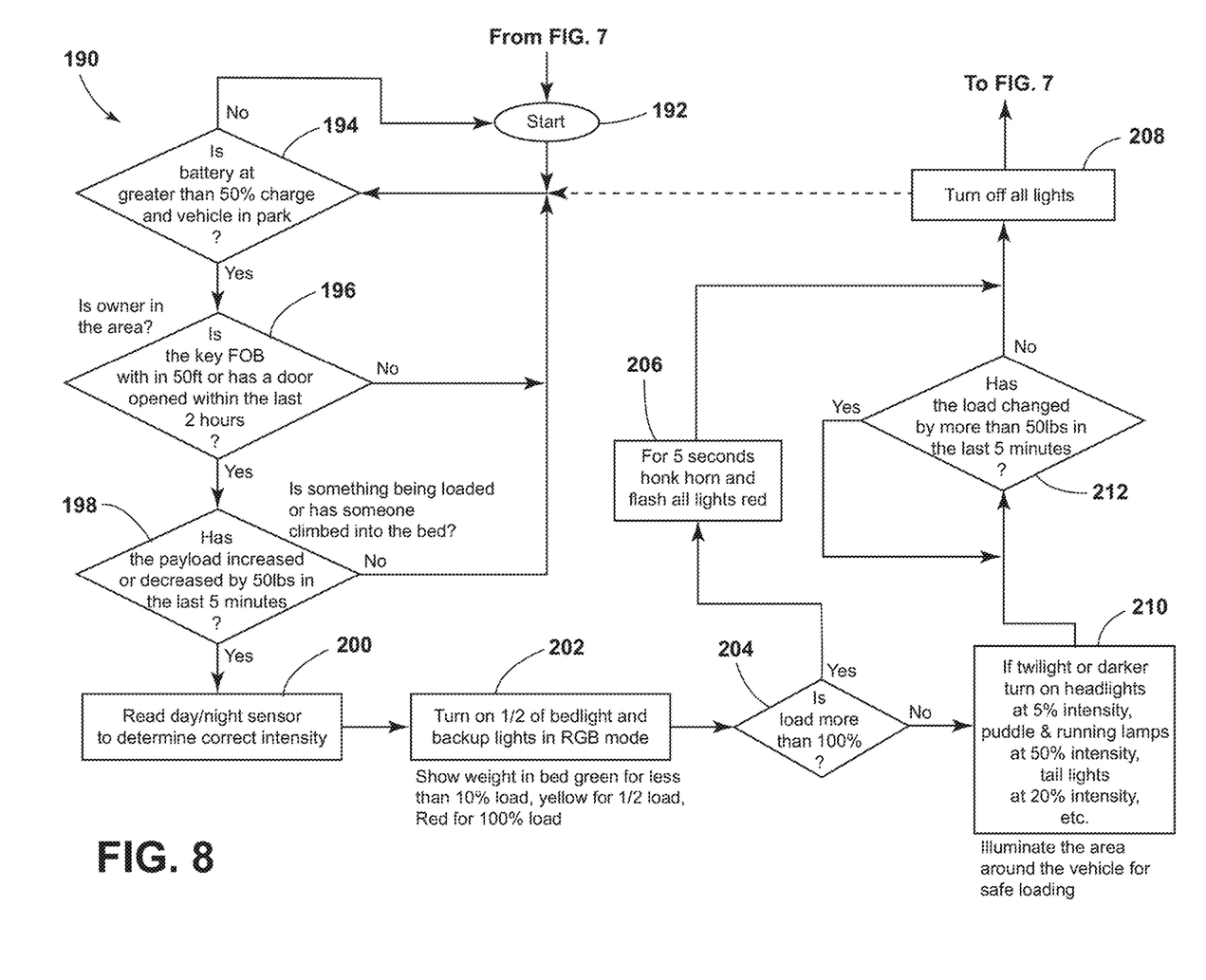
FIG. 8 is a flow chart showing a RGB scale routine of a load indicator system.

With continued reference to FIGS. 1-8, the load indicator system 11 may include a load balance system 12 and a load capacity system 13. The load balance system 12 may measure and indicate whether loads are evenly distributed in two or more areas A of a vehicle bed 22. The load capacity system 13 may measure and indicate whether a load in excess of a maximum allowable load has been disposed in the vehicle bed 22. Both the load balance system 12 and the load capacity system 13 may utilize load indicators 50 disposed inside and/or outside the vehicle 10 to assist the operator 94 in loading the vehicle bed 22 so that the loads are evenly distributed in one or more areas A of the vehicle bed 22 and so that the loads are within a maximum allowable load. A block diagram of the load balance system 12 is shown in FIG. 5. A load balance control routine 170 is shown in FIG. 7. A block diagram of the load capacity system 13 is shown in FIG. 6. A load capacity scale routine 190 is shown in FIG. 8.

With continued reference to FIGS. 1-8, in the embodiment shown, the vehicle 10 is a pickup truck which includes a body defining a bed area 18. A vehicle bed 22 is operably coupled to the frame 26 through a plurality of mounting features 34, 38, 42, 46. In the embodiment shown, a load sensor 30 is positioned on each of the mounting features 34, 38, 42, 46 and configured to sense a load (for example, load B) on the vehicle bed 22 associated with cargo in the vehicle bed 22. The load is the weight of cargo loaded in the vehicle bed 22. The weight of the cargo may be represented by arrow F in FIG. 2. The mounting features 34, 38, 42, 46 may each be associated with a quadrant (first quadrant I, second quadrant II, third quadrant III, fourth quadrant IV) of the vehicle bed 22. A load corresponding to the load disposed in each of four quadrants (I, II, III, IV) of the vehicle bed 22 may be measured by the load sensors 30 disposed on each of the mounting features 34, 38, 42, 46. It should be appreciated that other load sensing arrangements may be employed. Other load sensing arrangements may include height sensors 130 disposed proximate or in the shock absorbers of each of the vehicle tires 52, 53, 54, 55. The height sensors 130 may provide inputs to load sensors 30 disposed proximate each of the vehicle tires 52, 53, 54, 55. Load sensors 30 may also be disposed away from the vehicle 10 and may be in wireless communication with the vehicle 10. It should further be appreciated that the load indicator system 11 may be used on other vehicles such as sedans, SUV and others to sense and indicate loads.

Figure 1:
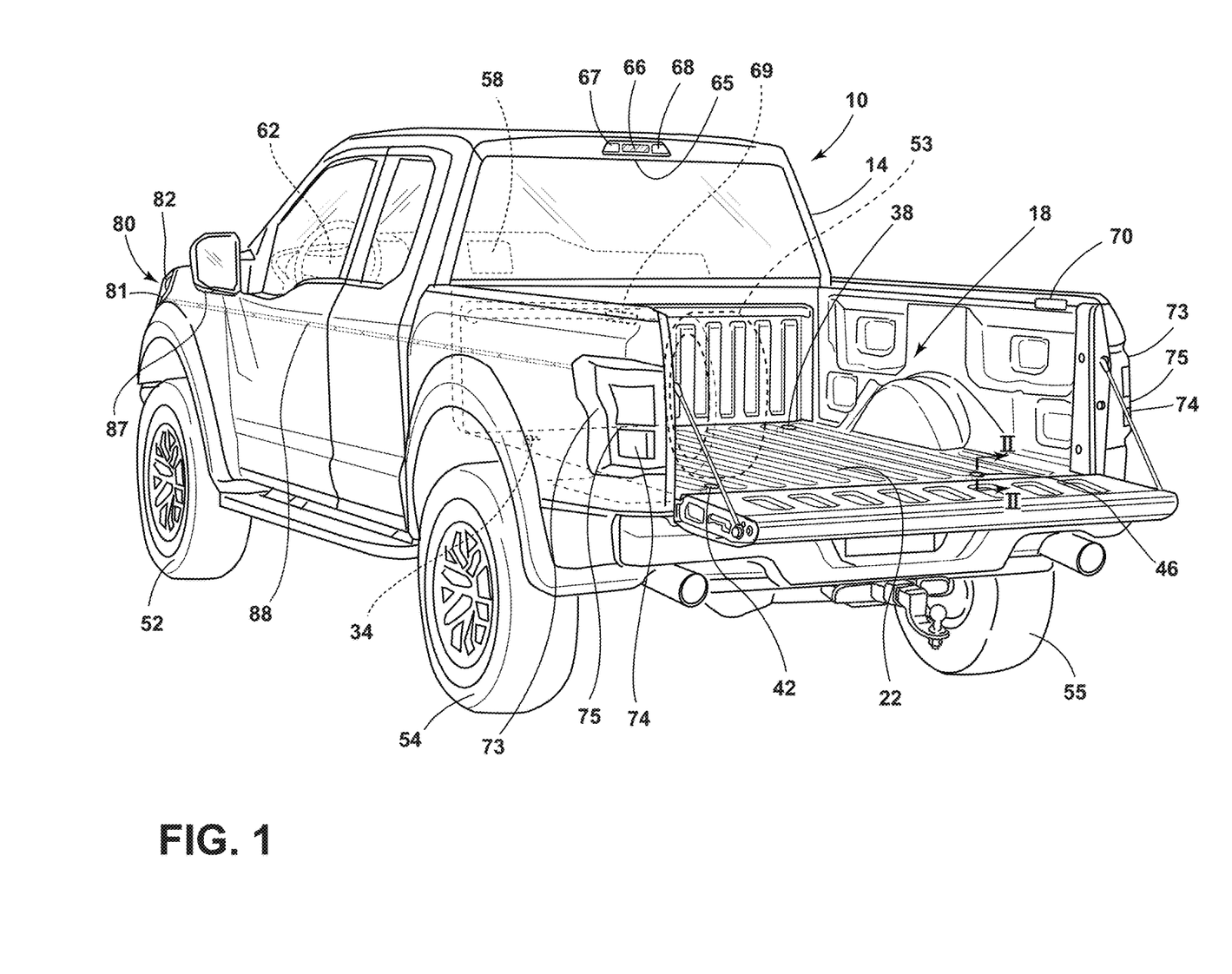
FIG. 1 is a rear perspective view of a vehicle equipped with a load indicator system, according to one embodiment.

With reference to FIG. 1, various lights are located on the vehicle 10. In one embodiment, the CHMSL (Center High Mount Stop Light) 65 includes brake light 66 and bed lights 67 and 68, which perform courtesy light and load indicator functions. In one embodiment, bed light 67 may be a courtesy light and bed light 68 may be a load indicator 50. Alternatively, bed light 68 may be a courtesy light, and bed light 67 may be a load indicator 50. In one embodiment, the bed lights 67 and 68 may also be bed lights that provide an indication of a load amount in the first quadrant I corresponding to bed light 68 and the second quadrant II corresponding to bed light 67, In various embodiments, as shown in FIG. 3, bed lights 68 and 67 may be separate from the CHMSL. The vehicle 10 may also include bed lights 69 and 70 that may be disposed on the side of the vehicle bed 22. Bed light 69 may provide an indication of a load amount in the third quadrant HT of the vehicle bed 22. Bed light 70 may provide an indication of a load amount in the fourth quadrant IV of the vehicle bed 22.

Figure 1A:
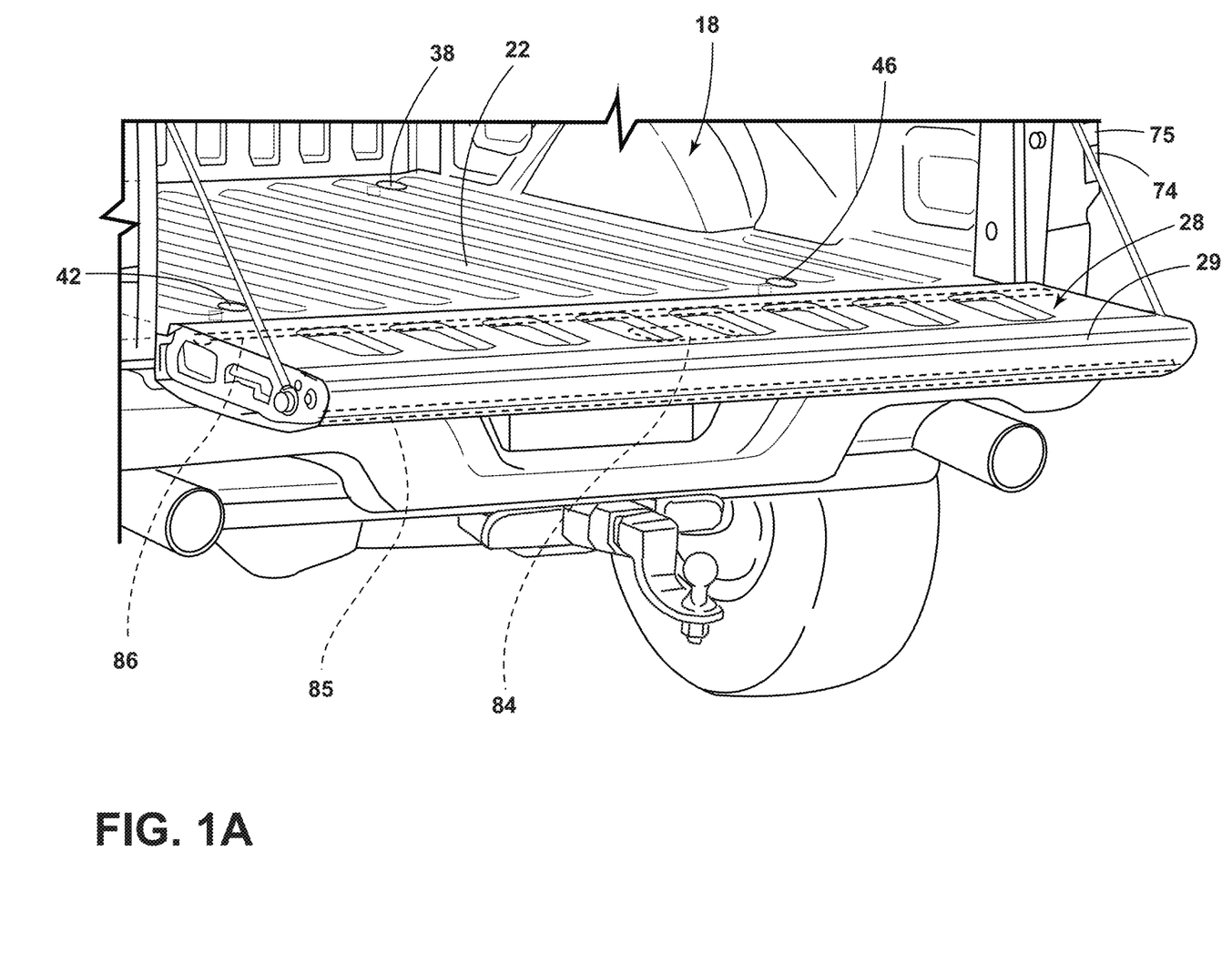
FIG. 1A is an enlarged view of the tailgate area of the vehicle of FIG. 1 illustrating the tailgate of a vehicle equipped with the load indicator system.
Figure 2:
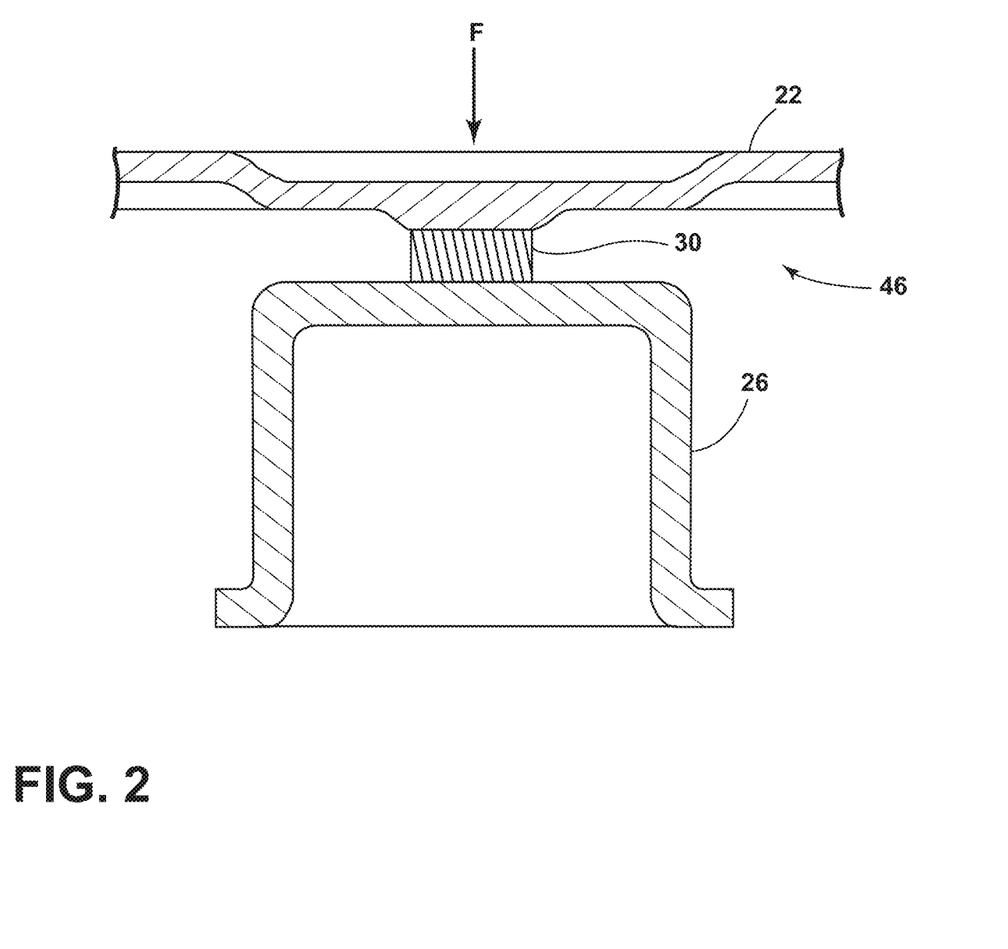
FIG. 2 is a cross-sectional view taken through line II-II of FIG. 1 illustrating a load sensor of the load indicator system, according to one embodiment.

The vehicle 10 may include tail lights 73 and front lights 80. Each tail light 73 may include a stop/brake light 74 and backup light 75. The backup light 75 may sometimes be referred to as the reverse light. Each front light 80 may include running lamps 81 and head lights 82. Puddle lamps 87 may also be located on the vehicle 10. Lighted stripes 88 may be located on the vehicle 10. Referring now to FIG. 1A, the tailgate area 28 may have tailgate handle light 84, tailgate top light 85, and tailgate bottom light 86 on tailgate 29.

The load indicator system 11 may include one or more load indicators 50 that can provide an output indicative of a load condition. Such load indicators 50 may include horn 62, backup light 75, brake light 66, bed light 67, bed light 68, bed light 69, bed light 70, stop/brake light 74, and miscellaneous exterior lamps including puddle lamps 87, lighted stripes 88, tailgate handle light 84, tailgate top light 85, tailgate bottom light 86, and panel exciter 90. The load indicators 50 may further include a display 58, such as an IP touch screen. The load indicators 50 may also include one or more electronic devices in communication with the load sensor. The electronic devices may include telephones or computers. The term "communication" as used herein refers to hardwired or wireless communication. For example, the bed load sensor 30 may be in wireless communication with the cell phone 92 of an operator 94. The load indicator system 11 may include or make use of the load balance system 12, the load capacity system 13, and other systems in the vehicle 10. The horn 62 may emit various audible sounds, including honking and chirping sounds.

Backup light 75 and bed lights 67, 68, 69, 70 may include RGB LEDs. A RGB LED is a red, green, blue light emitting diode light source that can mix together colors in various ways to produce a wide array of light colors. For example, a RGB LED could indicate the percentage of allowable weight in the bed area 18 by showing a green colored light for less than a 10% load, a yellow colored light for a 50% load, and a red colored light for a 100% allowable load. A PWM mixture refers to pulse width modulation, which is a modulation technique used to encode a message into a pulsing signal. The PWM feature may be incorporated in the RGB LEDs to generate different proportions of the red, green and blue colors. For the loading measurement function, backup light 75 and bed lights 67, 68 could cycle from green for no (less than 10%) load and red for fully (100%) loaded with a PWM mixture in between to indicate the exact amount of load by color. In one embodiment, the two bed lights 67, 68 on the CHMSL 65 may be configured to function as load indicators 50 and/or courtesy lights. For example, while the operator 94 is loading the vehicle 10, bed light 67 may be configured to act as a load indicator 50 while bed light 68 acts as a courtesy light. Alternatively, while the operator 94 is loading the vehicle 10, bed light 68 may be configured to act as a load indicator 50 while bed light 67 may act as a courtesy light. In another example, for the loading measurement function, bed lights 69, 70 and bed lights 67, 68 could cycle from green for no load (less than 10% of a predetermined load amount) and red for fully loaded (100% of a predetermined load amount) with a PWM mixture in between to indicate the exact amount of load by color.

With reference to FIG. 3, the load indicator system 11 may include a load balance system 12 configured to display varied load states in various areas A of the vehicle bed 22. With reference to FIG. 3, examples of areas A of a vehicle bed 22 may include a first quadrant I, a second quadrant II, a third quadrant III, or a fourth quadrant IV of a vehicle bed 22. The vehicle bed 22 may include at least two areas A that are referred to as side 71 and side 72 that may each include an associated load state display. With reference to FIG. 3 and as previously explained, the bed light 68 may be activated to illuminate the first quadrant I. The bed light 67 may be activated to illuminate the second quadrant II. The bed light 69 disposed on a side of the vehicle bed 22 at the rear of the vehicle bed 22 may be activated to illuminate a third quadrant III. The bed light 70 disposed on a side of the vehicle bed 22 at the rear of the vehicle bed 22 may be activated to illuminate a fourth quadrant IV. As such, the optics of the bed lights 68, 67, 69, 70 may be adjusted to cover a corresponding area (quadrant I, II, III, IV, respectively) of the vehicle bed 22. Illumination of the quadrants (I, II, III, IV) of the vehicle bed 22 in different colors representing desired load placement areas A may provide a visible indication of the desired loading locations in the vehicle bed 22 of the vehicle 10. As previously explained, the bed lights 68, 67, 69, 70 corresponding to each of the four quadrants (I, II, IV) may include RGB LEDs that may indicate the availability for loading of each of the four quadrants (I, II, III, IV).

With continued reference to FIG. 3, in one example, the quadrant (I, II, III, or IV) with the lowest load may be illuminated with a green bed light. The remaining quadrant(s) with loads that are within 10% of the lowest load may also be illuminated with a green bed light. The remaining quadrant(s) with load(s) that are 110% or more of the lowest load may be shown as amber, An operator 94 may infer that he or she should continue loading the quadrant(s)

designated green and discontinue loading the quadrant(s) designated amber to obtain a balanced load (all quadrants designated green). The load balance control routine 170 (FIG. 7) may continuously run until loading is balanced (within 110% of the lowest load on all four quadrants I, II, III, IV). Thus, an operator 94 may refer to the colors of the bed lights 67, 68, 69, 70 to obtain directions for loading the vehicle bed 22, so that loads are balanced among the four quadrants I, II, III, IV of the vehicle bed 22.

With reference to FIGS. 3-4, in another example, the bed lights 67 and 68 may display the state of side-by-side balancing of loads (for example, load B) in the vehicle bed 22. In side-by-side balancing of loads in the vehicle bed 22, the loads in the two areas A (side 71 and side 72) of the vehicle bed 22 may be compared. A side 71 of the vehicle bed 22 corresponding to bed light 67 may include the second quadrant II and the third quadrant Iii. A side 72 of the vehicle bed 22 corresponding to bed light 68 may include the first quadrant I and the fourth quadrant IV. In the side-by-side bed light load display 104, the bed light 67 may project a color indicative of a loading condition on the side 71 of the vehicle bed 22. The bed light 68 may project a color indicative of a loading condition on the side 72 of the vehicle bed 22. For example, a green light indicating availability for loading may be displayed on a side 71 of the vehicle bed 22. An amber light indicating that loading may not be advisable may be displayed on a side 72 of the vehicle bed 22. As such, the green and amber colors of the respective sides 71, 72 of the vehicle bed 22 may guide the operator 94 during loading of the vehicle bed 22.

With reference to FIG. 4, in another example, the side-by-side balancing of the vehicle bed 22 may be ascertained from the side-by-side tail light load display 108. In one example, each tail light 73 may include four LEDs 112 that may be displayed as a bar graph or another display. Each tail light 73 could be linked to a cell phone 92 of an operator 94 with a wireless communication such as a Bluetooth Low Energy (BLE) or Wi-Fi wireless networking technology. The tail lights 73 could receive inputs from load sensors connected to height sensors 130 in shock absorbers in the rear vehicle tires 54, 55. Balanced loading of a side 71 of the vehicle bed 22 and a side 72 of the vehicle bed 22 may be shown by a matching number of illuminated LEDs 112 in bars of a graph or chambers in each tail light 73.

Referring again to FIG. 3, a diagram of load distributions in the vehicle bed 22, including the four quadrant display 100 and the side-by-side bed light load display 104, may also be transmitted to the cell phone 92 of an operator 94 with wireless technology, such as Bluetooth Low Energy (BLE) or Wi-Fi wireless networking technology.

Referring to FIG. 4, spot lights 116, marker lights 120, and lights 124 on top of a vehicle cab are shown. The spot lights 116, marker lights 120, and lights 124 on top of a vehicle cab may function as load indicators 50 and/or courtesy lights.

Additionally, with continued reference to FIG. 4, if an overload condition exists and an operator 94 attempts to put the vehicle 10 into gear, then a first or second scenario might take place. In a first scenario, vehicle interior lights may flash until turned off with a message shown in an instrument panel cluster and/or display 58. The message shown on the instrument panel cluster and/or on a display 58 may indicate to an operator 94 inside the vehicle 10 that something is wrong. In a second scenario, flashing exterior lights (for example, spot lights 116, marker lights 120, and lights 124 on top of a vehicle cab) may be activated automatically to alert other vehicles that the vehicle 10 is overloaded. The flashing exterior lights may be optionally shut off by the operator 94.

With continued reference to FIG. 4, to provide an audible notification of an unbalanced load or an overload condition, an audio sounder or speaker may replace or augment a horn chirp. The audio sounder or speaker may include a panel exciter 90. In one example, a panel exciter 90 may be used to convey verbal and/or other audio notifications about a vehicle overload condition. For purposes of balancing a load, the panel exciter 90 may call out the percentage of allowable load left in an area A of the vehicle 10 and the number of pounds available to load in an area A of the vehicle 10. The panel exciter 90 may be an exterior panel exciter 90 mounted on a vehicle 10. The panel exciter 90 may be mounted on an A pillar, a B pillar, a vehicle door, or another location on the vehicle 10. Panel exciters 90 may provide chimes, verbal messages, and other audio signals for an operator 94 while avoiding speaker grilles. A panel exciter 90 may utilize exterior trim that may act as a speaker grille. It is contemplated that panel exciters 90 may also be used to direct audible noise to the interior of a vehicle 10.

With reference to FIG. 5, a block diagram is shown of a load balance system 12 of the load indicator system 11 of the vehicle 10. Inputs 131 may include load sensors 30 in the bed area 18 and load sensors 30 in the shock absorber vicinity. The load sensors (vehicle bed 22) may be located at mounting features 34, 38, 42, and 46. The load sensors 30 (shocks) may be located proximate height sensors 130 disposed in or near shock absorbers associated with each vehicle tire 52, 53, 54, 55. The height sensors 130 may provide inputs to the load sensors 30 so that the load sensors 30 may determine the load in each quadrant I, II, III, IV based on the input from each height sensor 130. Each load sensor 30 may be in communication with the controller 132. The load sensors 30 may emit an analog, digital, or bus signal to the controller 132. The inputs 131 may also include a key fob signal 147 indicative of the proximity of an operator 94 to the vehicle 10. The controller 132 may include a processor 134 and a memory 136 for executing stored control routines 138 or for storing information (e.g., related to the operation of load sensor and/or vehicle inputs). In the depicted embodiment, the memory 136 of the controller 132 includes a control routine 138. In various embodiments, the controller 132 may be a standalone device that is not in communication with body control modules, electronic control modules, engine control modules, and/or other features of the vehicle 10. In various embodiments, the controller 132 can be any type of control circuitry. For example, the controller 132 could be a switch on a wire. The controller 132 may selectively activate one or more load indicators 50 in response to a sensed load input from a load sensor 30. The outputs 99 may include various load indicators 50 arranged in a four quadrant (I, II, III, IV) load display 100, a side-by-side bed light load display 104, or a side-by-side tail light load display 108. The four quadrant (I, III, IV) load display 100 may include a bed light 67, a bed light 68, a bed light 69, and a bed light 70. The side-by-side bed light load display 104 may include bed light 67 and bed light 68. Bed light 67 and bed light 68 may be activated to compare the load amounts of side 71 of the vehicle bed 22 and side 72 of the vehicle bed 22. In the side-by-side tail light load display 108, tail lights 73 may be activated to compare the load amounts of side 71 of the vehicle bed 22 and side 72 of the vehicle bed 22. The outputs 99 may also include a panel exciter 90 that may call out the percentage of allowable load remaining in an area A to be loaded and the number of pounds available to load in an area A of the vehicle 10.

With reference to FIG. 6, a block diagram is shown of the load capacity system 13 of the load indicator system 11 of the vehicle 10. Load sensors 30 are in communication with controller 152. Load sensor 30 may emit an analog, digital, or bus signal to the controller 152. The controller 152 may include a processor 154 and a memory 156 for executing stored routines or for storing information (e.g., related to the operation of load sensor 30 and/or vehicle inputs 140). In the depicted embodiment, the memory 156 of the controller 152 includes a control routine 158. In various embodiments, the controller 152 may be a standalone device that is not in communication with body control modules, electronic control modules, engine control modules, and/or other features of the vehicle 10. In various embodiments, the controller 152 can be any type of control circuitry. For example, the controller 152 could be a switch on a wire. In the depicted embodiment, the controller 152 may be in communication with one or more vehicle inputs 140 that may be used in conjunction with the controller 152 and may communicate with the controller 152 through a multiplex communication bus (for example, LIN, CAN). In one embodiment, the vehicle input 140 may include communications from one or more vehicle sensors 142. The vehicle sensors 142 may include a gear position or transmission sensor 144, a door courtesy switch 145, a battery state of charge sensor 146, a key fob signal 147, a day/night sensor 148, and/or any other sensor that may be disposed within or in communication with vehicle 10. The door courtesy switch 145 may provide a door ajar indication. The day/night sensor 148 may detect the ambient light level near the vehicle 10.

With continued reference to FIG. 6, the controller 152 may selectively activate one or more load indicators 50 in response to a vehicle input 140 and/or a sensed load input from load sensor 30. In the depicted embodiment, load indicators 50 include horn 62, PWM RGB backup light 75, PWM RGB bed light 67, PWM RGB bed light 68, display 58, stop/brake light 66, stop/brake light 74, tailgate handle light 84, tailgate top light 85, tailgate bottom light 86, puddle lamps 87, lighted stripes 88, spot lights 116, marker lights 120, lights 124 on top of the vehicle cab, tail lights 73, and panel exciter 90.

In one example, controller 152 may receive an input 140 that is the load sensed by the load sensor 30 and an input 140 that is the ambient light level from the day/night sensor 148. The controller 152 may selectively activate one or more load indicators 50 to generate an output 160 in response to the load sensed and the ambient light level.

In another example, controller 152 may receive an input 140 that is the load sensed by the load sensor 30 and an input 140 that is the door ajar indication from the door courtesy switch 145. The controller 152 may selectively activate one or more load indicators 50 to generate an output 160 in response to the load sensed and the door ajar indication.

With reference now to FIG. 7, an embodiment of a load balance control routine 170 is shown. In the depicted embodiment, the load balance control routine 170 may begin at the start 172 when the first steps are taken to determine recent load changes. From step 172, the control routine proceeds to decision step 174. At decision step 174, a determination is made of whether the load has stabilized for the last 5 seconds, but for less than 10 seconds. In one example, at decision step 174, when the load changes a scale first shows the absolute payload for 5 seconds and then switches to showing the balancing of the two or more loads for 5 seconds. If the answer to the conditions in decision step 174 is affirmative, then the load balance control routine 170 proceeds to decision step 176. If the answer to the conditions in decision step 174 is negative, then the load balance control routine 170 proceeds to step 178. At step 178, the load balance control routine 170 goes to the RGB scale routine or load capacity scale routine 190 as shown in FIG. 8. At step 176, the determination is made whether the load is balanced within 10% on all four quadrants. If the answer to the conditions in decision step 176 is affirmative, then the load balance control routine 170 proceeds to step 178. At step 178, the routine goes to the load capacity scale routine 190 shown in FIG. 8. If the answer to the conditions in decision step 176 is negative, then the load balance control routine 170 proceeds to step 180. At step 180, the load balance control routine 170 proceeds to show the lowest load and any loads within 10% as green and to show the remaining load(s) as amber. It is to be understood that the load indicator system 11 detects load changes due to initial loading of the vehicle 10, moving a load from one load area A to another load area A (i.e., moving a load from one quadrant to another quadrant for the four quadrant load display 100 or moving the load from one side 71 to another side 72 for the side-by-side bed light load display 104, and the side-by-side tail light load display 108), and removing a load from the bed.

Referring to FIG. 8, an embodiment of the load capacity scale routine 190 (also referred to as the RGB scale control routine) for sensing and indicating a load of a vehicle 10 is depicted. In the depicted embodiment, the load capacity scale routine 190 may begin at step 192 when the first steps are taken to determine the vehicle status. From step 192, the load capacity scale routine 190 proceeds to decision step 194. At decision step 194, if the battery is at greater than 50% charge and the vehicle is in park, the load capacity scale routine 190 proceeds to decision step 196. Decision step 196 is where the determination is made of whether the key fob is within 50 feet of the vehicle or whether a vehicle door has opened in the last two hours. If the answer to one or both of the conditions in decision step 196 is affirmative, the load capacity scale routine 190 proceeds to decision step 198. The determination of step 196 indicates whether the owner is in the area. At decision step 198, the load capacity scale routine 190 determines whether the payload has increased or decreased in weight by an incremental amount of 50 pounds in the last 5 minutes. If the answer to one or both questions is yes, then the next step 200 of the load capacity scale routine 190 is performed. The determination of step 198 indicates whether something is being loaded into or unloaded from or out of the vehicle bed or whether someone has climbed into or out of the vehicle bed 22. The next step 200 of reading the day/night sensor 148 to determine the correct intensity of indicator 50 lights is performed. Next step 202 directs that bed light 67 or 68 and backup light 75 are turned on in RGB mode. At step 202, in one embodiment, the bed light 67 or 68 and the backup light 75 can indicate the weight in the vehicle bed 22 by showing green for less than a 10% load, yellow for a 50% load, and red for a 100% load. Next a determination is made at decision step 204 as to whether the load is more than 100%. If the answer at step 204 is affirmative, then the next step 206 is that the horn 62 is activated to honk for 5 seconds while all lights flash red. In one embodiment, all lights that flash red may comprise the CHMSL brake light 66, stop/brake light 74, CHMSL bed light 67, CHMSL bed light 68, bed light 69, bed light 70, and backup light 75. After that, all lights turn off at step 208. The load capacity scale routine 190 returns to step 172 of the load balance control routine in FIG. 7 or to step 194. At decision step 204, if the load is not more than 100%, then if it is twilight or darker, indicative of a low or no light ambient condition, the head lights 82 are turned on at 5% intensity, puddle lamps 87 and running lamps 81 are turned on at 50% intensity, and tail lights 73 are turned on at 20% intensity. Also, other courtesy lights, including lighted stripes 88, tailgate handle light 84, tailgate top light 85, and tailgate bottom light 86, may be turned on. Head lights 82, puddle lamps 87, running lamps 81, tail lights 73, and other courtesy lights, including lighted stripes 88, tailgate handle light 84, tailgate top light 85, tailgate bottom light 86, spot lights 116, marker lights 120, lights 124 on top of the cab, and tail lights 73, are turned on to illuminate the area around the vehicle 10 for illuminated loading. Decision step 212 asks whether the load has changed by more than 50 pounds in the last 5 minutes, lithe answer is affirmative, then the lights in step 180 remain on until the load has not changed by more than 50 pounds in the last 5 minutes. If the answer at 212 is negative, then all lights turn off at step 208. The determination at step 212 indicates whether loading has finished. The load capacity scale routine 190 proceeds to its early state by returning to step 194 or to the start (step 172) of the load balance control routine 170.

In one example, if an overload condition exists during loading, bed lights 67, 68, 69, and/or tail lights 73 may display a load state while all other exterior lights may flash.

In one example, if an overload condition exists, interior lights may flash until turned off, and a message may appear in the display 58.

A variety of advantages may be derived from the use of the present disclosure. An operator 94 may be able to intuitively and easily understand the amount of load the operator 94 has loaded into the vehicle 10 while the operator 94 is loading the vehicle 10. An operator 94 may be able to follow directions for loading a vehicle bed 22 so that substantially uniform load distribution occurs in the vehicle bed 22. Information about the distribution of a vehicle load may be shown with vehicle lights or other audible indicators (for example, horns 62 or panel exciter 90). RGB bed lights 67, 68, 69, 70 may provide load balancing information (see, for example, load balance system 12 in FIG. 6) and absolute load information (see, for example, load capacity system 13 in FIG. 7). Intuitive visible indication of the vehicle bed 22 by quadrant I, II, III, and IV may facilitate loading. As such, the vehicle 10 load may be indicated through use of existing vehicle features (for example, horn 62, lights, display 58). The vehicle load may be indicated in a location on the vehicle 10 that is visible to an operator 94 loading a vehicle 10. The vehicle load may also be indicated on a display 58 in the vehicle 10 or on a cell phone 92 or other remote device. Courtesy lights responsive to ambient light levels may illuminate in combination with load indicators 50 to aid loading.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc) generally means the joining of two components (electrical or mechanical) directly, or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only, Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector to other elements of the system may be varied, and the nature or numeral of adjustment positions provided between the element may be varied. It should be noted that the elements and/or assemblies of the system may be constructed from any of the wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims as set forth below, are incorporated into and constitute part of this Detailed Description.

What is claimed is:

1. A load balance system for a vehicle, comprising:
   first and second load indicators visible outside of the vehicle;
   a bed disposed in the vehicle;
   a first load sensor configured to sense a first load weight in a first area of the bed;
   a second load sensor configured to sense a second load weight in a second area of the bed;
   a controller in communication with the first load sensor, the second load sensor, a first load indicator, and a second load indicator, wherein the controller is configured to:
   activate the first and second load indicators to generate respective first and second outputs in response to a detection of a first load weight and a second load weight that are less than a predetermined threshold value, wherein the first and second outputs are the same; and
   activate the first and second load indicators to generate first and second outputs in response to the detection of the first load weight and the second load weight when one of the first load weight and the second load weight is above the predetermined threshold value, wherein the first and second outputs are different, and wherein the first load indicator comprises a first light, and wherein the second load indicator comprises a second bed light.

2. The load balance system for a vehicle claim 1, wherein the first bed light is configured to illuminate the first bed area to indicate an availability of the first bed area for receiving an additional load weight.

3. The load balance system for a vehicle of claim 2, wherein the second bed light is configured to illuminate the second bed area to indicate an availability of the second bed area for receiving the additional load weight.

4. The load balance system for a vehicle of claim 1, wherein the first load indicator and the second load indicator each include RGB LEDs (Red Green Blue light-emitting diodes).

5. The load balance system for a vehicle of claim 4, wherein the first load indicator and the second load indicator are each configured to display a first color when the first load weight and the second load weight are both below the predetermined threshold value.

6. The load balance system for a vehicle of claim 4, wherein one of the first load indicator or the second load indicator is configured to display a first color when one of the first load weight or the second load weight is below the predetermined threshold value, and wherein another of the first load indicator or the second load indicator is configured to display a second color when one of the first load weight and the second load weight is above the predetermined threshold value.

7. A load balance system for a vehicle, comprising:
first and second load indicators visible outside of the vehicle;
a bed disposed in the vehicle;
a first load sensor configured to sense a first load weight in a firm area of the bed;
a second load sensor configured to sense a second load weight in a second area of the bed;
a controller in communication with the first load sensor, the second load sensor, a first load indicator, and a second load indicator, wherein the controller is configured to:
active the first and second load indicators to generate respective first and second outputs in response to a detection of a first load weight and a second load weight that are less than a predetermined threshold value, wherein the first and second outputs are the same; and
activate the first and second load indicators to generate first and second outputs in response to the detection of the first load weight and the second load weight when one of the first load weight and the second load weight is above the redetermined threshold value, wherein the first and second outputs are different, and wherein the first load indicator comprises a first tail light, and wherein the second load indicator comprises a second tail light.

8. The load balance system for a vehicle of claim 7, wherein the first tail light and the second tail light each include one or more chambers configured to display the respective first output and the respective second output.

9. The load balance system for vehicle of claim 8, wherein the first and second tail lights are each configured to illuminate the same one or more chambers when the first load weight and the second load weight are both below a predetermined threshold value.

10. The load balance system for a vehicle of claim 9, wherein the first and second tail lights are each configured to illuminate different amounts of the one or more chambers when one of the first load weight and the second load weight is above the predetermined threshold value and one of the first load weight and the second load weight is below the predetermined threshold value.

11. The load balance system for a vehicle of claim 1, wherein the first and second load indicators are disposed outside of the vehicle.

12. The load balance system for a vehicle of claim 1, wherein the first and second load indicators are disposed inside of the vehicle.

13. The load balance system for a vehicle of claim 1, wherein the predetermined threshold value comprises 110% of the lower of the first load weight and the second load weight.

14. A load balance system for a vehicle, comprising:
first, second, third, and fourth load sensors disposed in respective first, second, third, and fourth areas of a bed disposed in the vehicle;
first, second, third, and fourth load indicators corresponding to respective first, second, third, and fourth areas of the bed;
a controller in communication with the first, second, third, and fourth load indicators and the first, second, third, and fourth load sensors and configured to:
determine a lowest weight of the first load weight, the second load weight, the third load weight, and the fourth load weight;
calculate a predetermined threshold value by multiplying the lowest weight of the first load weight, the second load weight, the third load weight, and the fourth load weight by a predetermined percentage;
determine whether each of the first load weight, the second load weight, the third load weight, and the fourth load weight is greater than, equal to, or less than the predetermined threshold value;
activate at least one of the first load indicator, the second load indicator, the third load indicator, and the fourth load indicator to display a first signal indicative of the first load weight, the second load weight, the third load weight, or the fourth load weight being less than the predetermined threshold value; and
activate the first load indicator, the second load indicator, the third load indicator, or the fourth load indicator to display a second signal indicative of the first load weight, the second load weight, the third load weight, or the fourth load weight being greater than or equal to the predetermined threshold value if the first load weight, the second load weight, the third load weight, or the fourth load weight is greater than the predetermined threshold value, wherein the first load indicator comprises a first bed light configured to illuminate a first quadrant of the bed, the second load indicator comprises a second bed light configured to illuminate a second quadrant of the bed, the third load indicator comprises a third bed light configured to illuminate a thin quadrant of the bed, and the fourth load indicator comprises a fourth bed light configured to illuminate a fourth quadrant of the bed.

* * * * *

UNITED STATES PATENT AND TRADEMARK OFFICE
CERTIFICATE OF CORRECTION

| | |
|---|---|
| PATENT NO. | : 11,378,440 B2 |
| APPLICATION NO. | : 16/539498 |
| DATED | : July 5, 2022 |
| INVENTOR(S) | : Salter et al. |

It is certified that error appears in the above-identified patent and that said Letters Patent is hereby corrected as shown below:

In the Claims

Column 13:
Claim 1, Line 5;
After "first" insert --bed--.
Claim 7, Line 39;
"firm" should be --first--.
Claim 7, Line 46;
"active" should be --activate--.
Claim 7, Line 57;
"redetermined" should be --predetermined--.

Column 14:
Claim 14, Line 62;
"thin" should be --third--.

Signed and Sealed this
Thirteenth Day of September, 2022

*Katherine Kelly Vidal*
*Director of the United States Patent and Trademark Office*